No. 805,020. PATENTED NOV. 21, 1905.
C. LAURICK.
MIXING AND KNEADING MACHINE.
APPLICATION FILED APR. 28, 1905.

5 SHEETS—SHEET 4.

Witnesses:
R. M. Smith
G. V. Forbes

Inventor:
Carl Laurick
By D. P. Wolhaupter
Attorney.

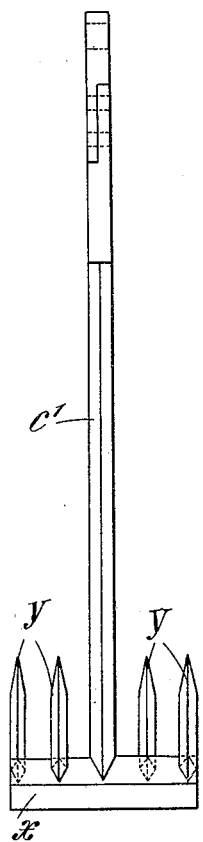
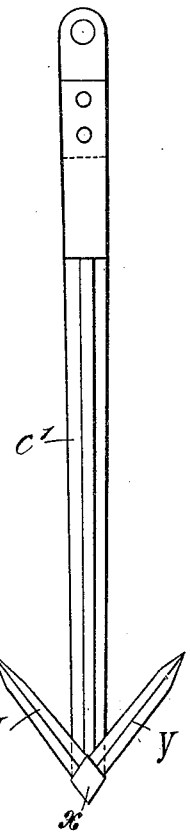
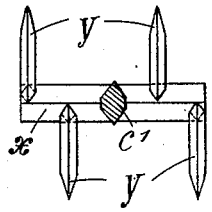

UNITED STATES PATENT OFFICE.

CARL LAURICK, OF BERLIN, GERMANY.

MIXING AND KNEADING MACHINE.

No. 805,020.  Specification of Letters Patent.  Patented Nov. 21, 1905.

Application filed April 28, 1905. Serial No. 257,871.

*To all whom it may concern:*

Be it known that I, CARL LAURICK, a subject of the King of Prussia, German Emperor, and a resident of Berlin, in the Kingdom of Prussia, German Empire, have invented certain new and useful Improvements in Mixing and Kneading Machines, of which the following is a full, clear, and exact description.

This invention relates to a machine for mixing and kneading pasty and like substances, having mixing and kneading arms set in oscillation by means of cranks and is characterized by a special method of moving the mixing and kneading arms, which rock on an axis of rotation moved vertically up and down, and also by an arrangement for enabling the troughs to be easily lifted without great expenditure of force, so that they may be discharged or emptied on tables or other raised places.

The machine is shown in the accompanying drawings.

Figure 1:
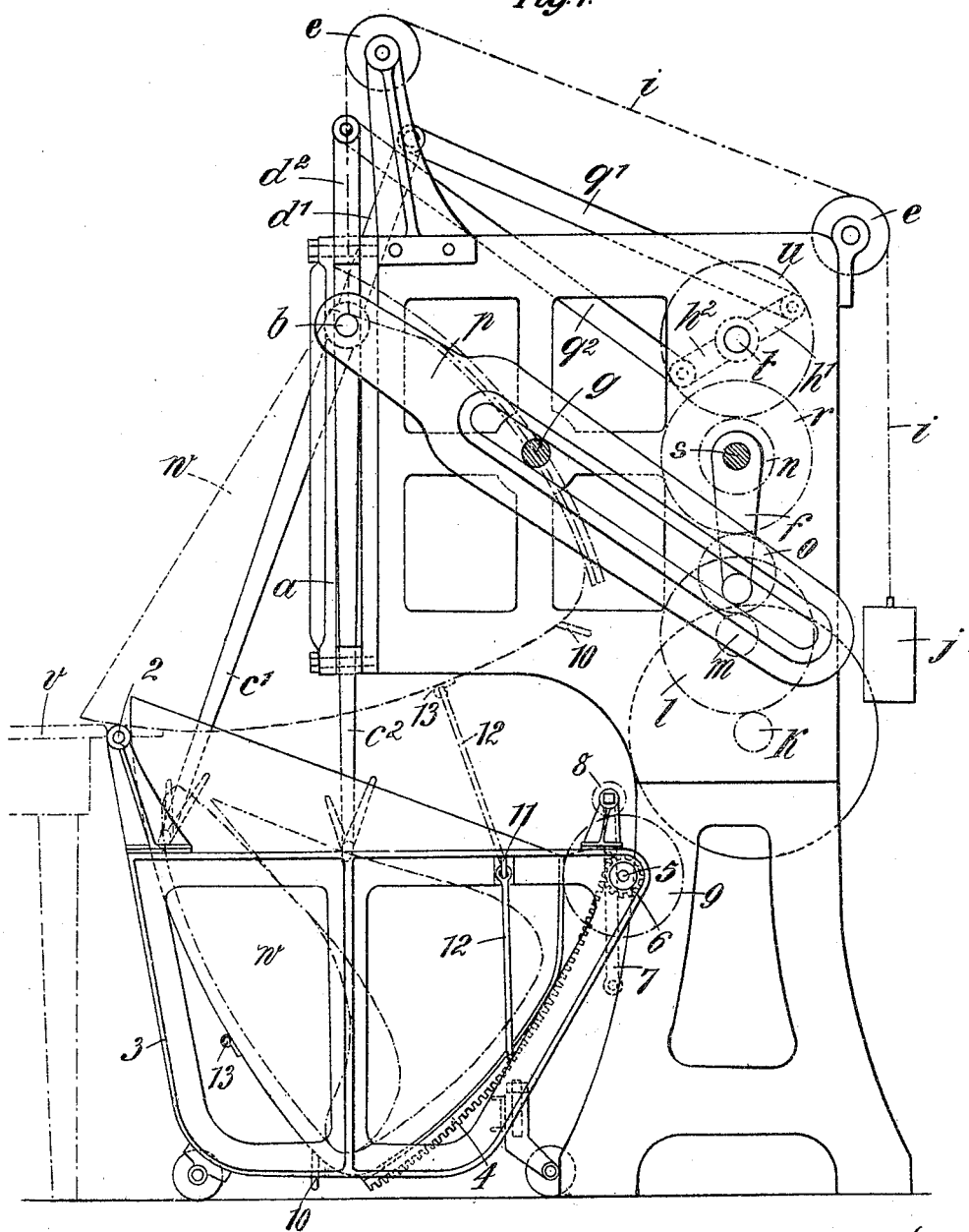
Figure 2:
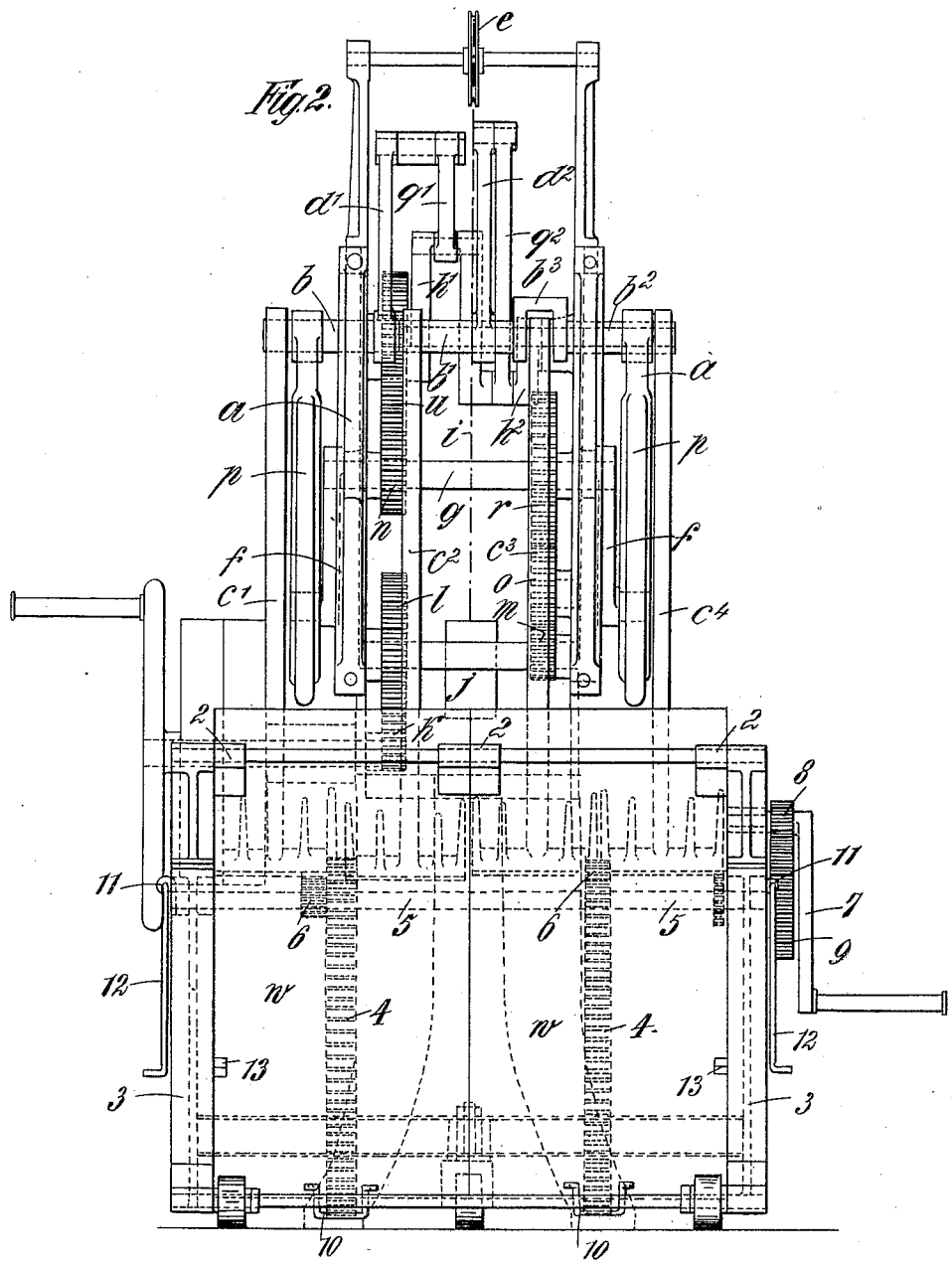
Figure 3:
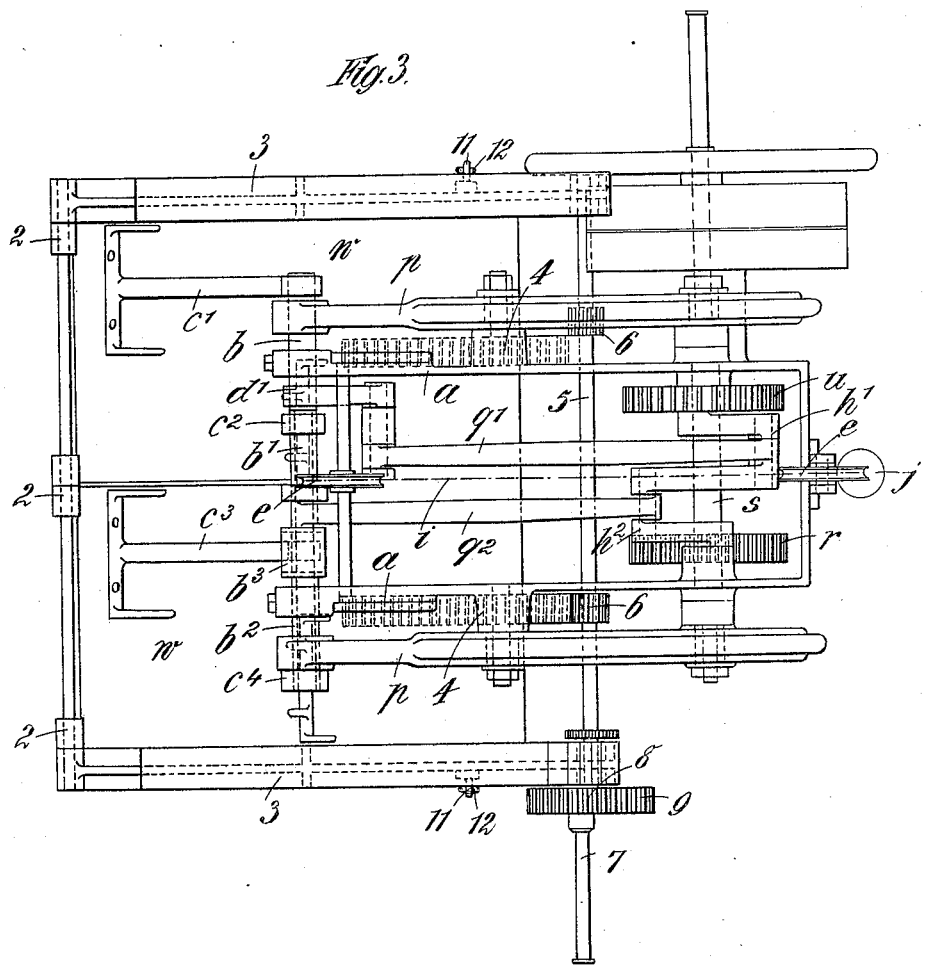
Figure 4:
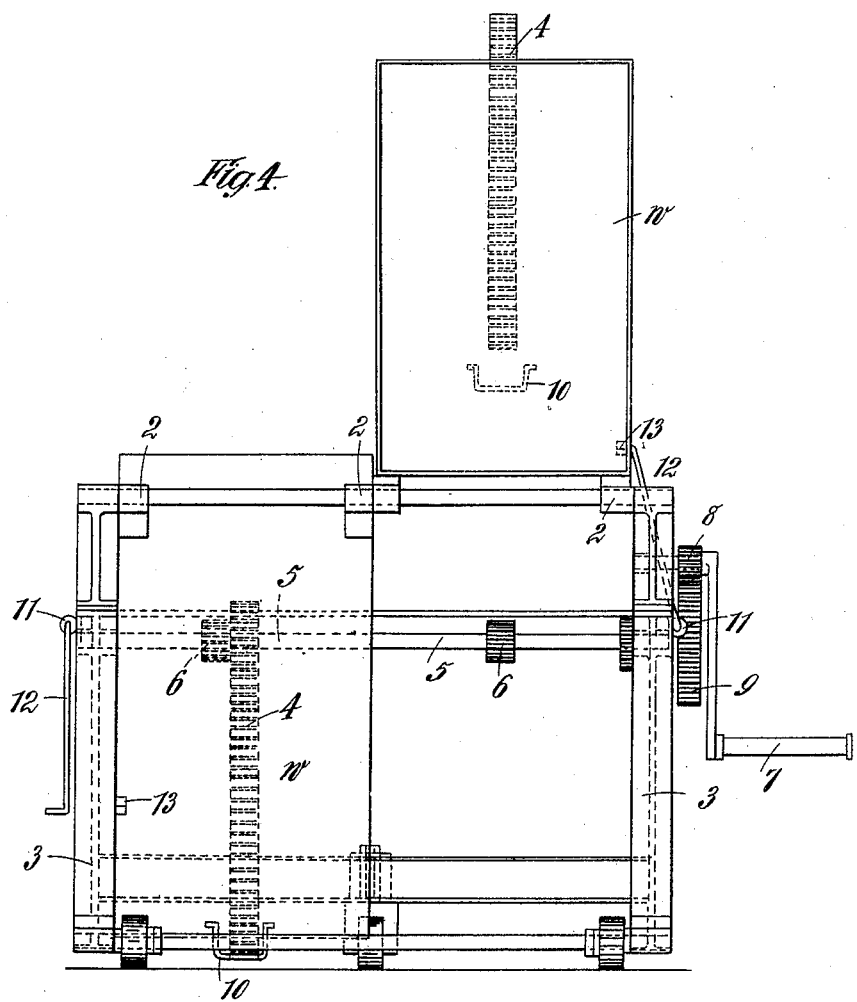

Figure 1 is a side view, Fig. 2 an end view, and Fig. 3 a plan view, while Fig. 4 is part of the view shown in Fig. 2 with the trough raised. Figs. 5, 6, 7, and 8 are a series of detail views showing the preferable construction of one of the kneading-arms.

Arms $c'$ $c^2$ $c^3$ $c^4$ are pivotally mounted on a shaft $b$, carried up and down in a vertical guide $a$, which shaft is moved up and down by a two-armed lever $p$, rocking on a fixed pivot $g$, and are swung to and fro on the shaft $b$ by means of cranks $h'$ $h^2$ and push-rods $q'$ $q^2$. The lever $p$ is operated by means of a crank $f$, which turns twice as fast as the cranks $h'$ $h^2$, so that the cranks $h'$ $h^2$ only execute one complete revolution in the time in which the crank $f$ executes two revolutions. By this means the result is obtained that, for instance, starting from the middle position of the kneading-arm $c^2$ shown in the drawings the lever $p$ moves the arm $c^2$ downward without thereby the crank $h'$ causing an essential movement or displacement of the kneading-arm. Then the lever $p$ again moves the arm $c^2$ upward, and now its respective crank $h'$ deflects it simultaneously to the left, and then the kneading-arm descends approximately in the middle of the trough, and then the crank $h'$ in its succeeding upward movement deflects it to the right. By this method of moving the kneading and mixing arms a very effective working through of the mass is obtained and also the further advantage that by reason of the specially rapid descent of the arms in the middle of the trough, which is produced by the crank $f$ alone causing the descent of the arms $c'$ $c^2$ $c^3$ $c^4$ during a small portion of its circulating course when it swings upon its pivot $s$ on the side (internal) facing the pivot $g$ of the lever $p$, and thus acts on a short arm of the lever $p$, fresh air can freely penetrate into the mass, whereby the mixing and kneading of the paste are considerably assisted. The movement may, however, take place also in the reverse way by the mixing and kneading arms rising in the middle of the trough and then alternately swinging out toward either side in order to move downward at the side of the trough and then again rise in the middle of the same.

The cranks $f$ and $h'$ $h^2$ may be driven by means of toothed wheels $k$, $l$, $m$, $o$, and $r$, the latter being on the shaft $s$ of the crank $f$, on which shaft a second toothed wheel $n$ is firmly mounted, which gears with a toothed wheel $u$, firmly mounted on the shaft $t$ of the cranks $h'$ and $h^2$, the toothed wheel $u$ having a pitch-circle twice that of the toothed wheel $n$, whereby the necessary speeding down of the cranks $h'$ $h^2$ as compared with the crank $f$ results.

In the form of construction shown four kneading-arms $c'$ $c^2$ $c^3$ $c^4$ are assumed, two of which are coupled alternately and execute their movement in opposite directions to the two other arms, whereby the effectiveness of the machine is increased. For this object the first and third kneading-arms $c'$ and $c^3$, respectively, are firmly mounted on the shaft $b$, the first arm $c'$ on a left-hand enlargement of this shaft, while the second and fourth kneading-arms $c^2$ and $c^4$, respectively, are mounted on sleeves $b'$ and $b^2$, loosely revolubly mounted on the shaft $b$, which sleeves are rigidly connected with one another by means of a bridge-piece $b^3$, projecting over the hub of the arm $c^3$, so that the arms $c'$ and $c^3$ may rock independently of the arms $c^2$ and $c^4$. The group of kneading-arms $c'$ $c^3$ is rocked to and fro by means of a crank $h'$, a rod $q'$, and an arm $d'$, firmly mounted on the shaft $b$, and the group $c^2$ $c^4$ by means of a crank $h^2$, rod $q^2$, and an arm $d^2$, firmly mounted on the sleeve $b'$, the cranks $h'$ and $h^2$ being opposed to one another. By this means the result is obtained that, starting, for instance, from the position shown of the pair of arms, they execute the movement indicated in dotted lines in Fig. 1 and, in fact, as mentioned, in one direction or the other. More than four kneading-arms may also be alternately coupled in this manner.

In order to equalize the weight of the mixing and kneading arms and the parts connected therewith, one or more counterweights $j$, Fig. 1, are connected with the rising and falling shaft $b$ by means of one or more chains or ropes $i$, carried over rollers $e$.

Where two or more arms or groups of arms are used, one or more partitions between the separate arms or group of arms may be inserted in the trough in order to enable two or more substances to be mixed and kneaded simultaneously in the separate compartments, or, as shown in Figs. 2 and 4, two or more independently-movable troughs may be arranged side by side.

In order to enable the trough or troughs $w$ to be lifted easily and without great expenditure of force, so that they may be emptied on tables $v$ or other like raised positions, they are pivotally mounted on their frame 3 on a hinge 2, Fig. 1, by their upper edge, which adjoins the table or the like, onto which they are to be discharged, and provided at their opposite side with a rack-bar 4, forming an arc struck from the center 2, which rack-bar gears with toothed pinions 6, which are not revoluble on the shaft 5, which is revolubly mounted in the frame 3. The shaft 5 may be caused to rotate by means of a crank 7 and the intermediary of toothed wheels 8 and 9, and thereby the trough $w$ may be wound up, which it is possible for one man to do without assistance. If the winding device 5 6 7 8 9 cannot be arranged high enough to allow of the lifting of the trough being operated so far as is necessary for the convenient and complete emptying of the trough, the latter part of the lifting of the trough may also take place by hand by means of a handle 10, provided on the trough, which after the winding device has operated the major part of the lifting no longer requires a great expenditure of force. When the trough has reached its highest position, (see the position shown in dotted lines in Fig. 1 and the position of the trough placed to the right in Fig. 4,) a stop-pin or support 12, hinged to the trough-frame 3 at 11, may be inserted in an eyelet or the like, 13, provided on the trough $w$, whereby the trough is held in its highest position and now may be emptied or discharged quietly and conveniently on the table or the like.

In order to only have to provide a single winding apparatus for two or more troughs, the pinions 6, engaging with the rack-bars 4 of the troughs, are displaceably arranged on the shaft 5, and the respective pinion 6 is then engaged with the rack-bar only for connection to the trough, which is to be tipped up, while the other pinion 6 is pushed aside from its rack-bar 4, as shown in Figs. 2 and 4.

For the purpose that the kneading-arms may move more easily through the mass the parts of the same moving in the trough $w$—namely, the lower part of the arms $c'$, the cross-bar $x$ at the lower end of the same, (see Figs. 5, 6, and 7,) and the fingers $y$, provided on the latter—have a sharp-edged cross-section, Figs. 7 and 8.

Having now particularly described and ascertained the nature of my said invention and in what manner the same is to be performed, I declare that what I claim is—

1. In a mixing and kneading machine, a rising and falling support, oscillating mixing and kneading arms carried by said support, and means independent of each other for reciprocating said support and for swinging said arms.

2. In a machine of the class described, vertically-reciprocating and laterally-oscillating mixing and kneading arms, and means for effecting the vertical reciprocation of the arms at a faster speed than their swinging movement.

3. In a machine of the class described, a rising and falling support, oscillatory arms carried by said support, means for reciprocating said support, and separate means for swinging the arms on said support at a different speed from the movement of the support.

4. In a machine of the class described, vertically-reciprocating and laterally-oscillating mixing and kneading arms, crank-controlled means for effecting said separate movements of the arms, the cranks which effect the rocking of the arms being arranged to travel at half the speed of the cranks which effect the vertical reciprocation of the arms.

5. In a machine of the class described, a rising and falling support, a fixed fulcrum, a slotted lever working over said fulcrum and connected with said rising and falling support, operating-cranks engaging the slotted levers, swinging mixing and kneading arms carried by said support, and separate operating-cranks having connections with the arms for rocking the same.

6. In a machine of the class described, a rising and falling support, crank-controlled means for reciprocating said support, swinging mixing and kneading arms carried by said support, and arranged in separate groups which respectively rock in opposite directions, and separate operating means connected with the arms for swinging the same on the rising and falling support.

In witness whereof I have hereunto set my hand in presence of two witnesses.

CARL LAURICK.

Witnesses:
 WOLDEMAR HAUPT,
 HENRY HASPER.